Patented May 27, 1952

2,598,561

UNITED STATES PATENT OFFICE 2,598,561

METHOD FOR PRODUCTION OF CHLORDANE

Morton Kleiman, Chicago, Ill., assignor to Velsicol Corporation, Chicago, Ill., a corporation of Illinois No Drawing. Application October 3, 1949, Serial No. 119,391

10 Claims. (Cl. 260—648)

This invention relates to a novel method for the chlorination of the Diels-Alder adduct of hexachlorocyclopentadiene and cyclopentadiene to produce the insecticidal composition of matter 1,2,4,5,6,7,8,8 - octachloro - 3a,4,7,7a - tetrahydro-4,7-methanoindane, designated chlordane (or chlordan). More particularly, this invention relates to the chlorination of said adduct by use of sulfuryl chloride as a chlorinating agent in the presence of a catalyst.

The adduct of hexachlorocyclopentadiene and cyclopentadiene can be prepared simply by intermixing said hexachlorocyclopentadiene and said cyclopentadiene in the presence or absence of additional solvent but preferably in the absence thereof. The reaction proceeds in a satisfactory manner at room temperature and also may be accomplished at cooler or more elevated temperatures. The reaction is somewhat exothermic and the temperatures thereof should be controlled such that temperatures not exceeding about 200° C. and preferably not exceeding about 100° C. are maintained throughout the course of the reaction. The reactants may be utilized in a molar ratio of 1:1; however, an excess of either reactant can be present. The reaction product, namely, the adduct of hexachlorocyclopentadiene and cyclopentadiene is crystalline in nature and may be purified by recrystallization from a solvent such as methanol.

Thus, for the purpose of illustration, a specific method for preparing the aforementioned adduct, is as follows: Hexachlorocyclopentadiene is placed in a vessel equipped with a mechanical stirrer, thermometer and reflux condenser. The hexachlorocyclopentadiene is then heated to about 70° C. and there is added thereto in a portionwise manner for better control an equal molar quantity of cyclopentadiene. The reaction temperature is maintained at about 70–85° C. After the cyclopentadiene is completely added, the stirring is continued for approximately one-half hour. The crystalline material thus formed is purified by recrystallization one or more times from methanol.

The reaction of hexachlorocyclopentadiene and cyclopentadiene may be symbolized as follows:

According to "The Ring Index" by Patterson and Capell, A. C. S. Monograph Series, No. 84, 1940, dicyclopentadiene, $C_{10}H_{12}$ is described as 4,7-methano-3a,4,7,7a-tetrahydroindene. Following this accepted system of nomenclature, the adduct of hexachlorocyclopentadiene and cyclopentadiene would be described as 4,7-methano-3a,4,7,7a-tetrahydro-4,5,6,7,8,8-hexachloroindene. Hereinafter, for the purpose of brevity, this compound, which is the starting material utilized in the process herein disclosed, will be referred to as chlordene.

The chlorination of olefinic materials to effect addition of a molecule of chlorine to an unsubstituted linkage thereof can ordinarily be easily accomplished by treatment of said olefinic material under mild conditions of temperature, time and pressure with sulfuryl chloride alone, either in the presence or absence of additional suitable solvent. Chlordene, on the other hand, although containing an unsubstituted olefinic linkage is peculiarly and unexpectedly inert to the action of sulfuryl chloride under mild conditions; and to effect reaction, higher temperatures and longer periods of reaction in the presence of peroxide are required. The chlorinated product derived by the use of such conditions generally comprises a mixture of compounds. These compounds, formed under such strenuous conditions, are generally a result of the introduction of 3 or more chlorine atoms. Chlordane, however (which is chlordene with 2 chlorine atoms added to the unsubstituted double bond), having the properties hereinafter disclosed, does not appear to be formed. Furthermore, the mixtures thus formed are not readily separable into pure components.

I have found, in accordance with the present invention, that sulfuryl chloride can be used to chlorinate chlordene to form a preponderance of chlordane under mild conditions of temperature and time, if the reaction is catalyzed as more fully hereinafter discussed.

Chlordane, which is a principal product of the process presently disclosed has the following structure:

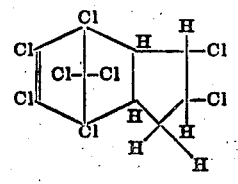

1,2,4,5,6,7,8,8-octachloro-3a,4,7,7a-tetrahydro-4,7-methanoindane

Chlordane is of great commercial importance as a constituent of technical chlordane, an insecticide widely accepted in the trade. The chlorination of chlordene, as heretofore commercially effected to produce 1, 2, 4, 5, 6, 7, 8, 8-octa-

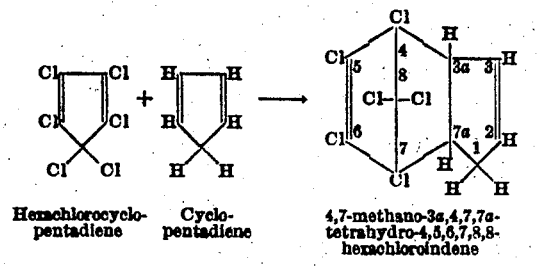

Hexachlorocyclopentadiene    Cyclopentadiene    4,7-methano-3a,4,7,7a-tetrahydro-4,5,6,7,8,8-hexachloroindene chloro-3a, 4, 7, 7a-tetrahydro-4,7-methanoindane by use of chlorine as a chlorinating agent, results in a mixture of materials having an average empirical formula $C_{10}H_8Cl_8$, which mixture is a viscous liquid not easily separable into its components. The reason this mixture arises is that chlorine either adds to the unsubstituted double bond of chlordene or is substituted for hydrogens contained in said chlordene or both, to yield side products other than and in addition to the dichloride of chlordene, the structure of which is previously indicated. The resultant viscous liquid cannot be readily separated into its components by distillation, crystallization or like ordinary means.

It is one object of this invention to provide a means for chlorinating chlordene to result in chlordane easily isolable from its concomitant products.

It is another object of this invention to provide a means for obtaining substantially pure chlordane in a high yield without the necessity of resorting to extraordinary methods of extraction or purification.

Another object of the present invention is to provide a simple, efficient method for rapidly chlorinating chlordene so as to produce valuable chlordane.

The present method of chlorination involves the use of sulfuryl chloride as a chlorinating agent in the presence of a catalyst. This process results in the addition of chlorine to the unsubstituted double bond of chlordene with a minimum of side reactions, thereby allowing said pure dichloride to be recovered in high yields by ordinary crystallization.

An obvious advantage of my present process is that along with rapid chlorination, a substantially pure uniform product can be obtained with a minimum of ordinary purification means. This product is a crystalline solid, having specific, identifiable properties, whereas the ordinary chlorination of chlordene with chlorine results in a liquid mixture not easily purified or separated into its components.

Being obtainable in the solid state, the product of the present process is more easily adaptable to formulation with dust carriers for use as an insecticide. If the product is formulated in its substantially pure state, an estimation of its content in insecticidal formulations to determine potency is facilitated. Further, if used pure, the insecticidal potency of the product of the present process is invariant with respect to haphazard modification of conditions of manufacture. If chlorine is used to chlorinate chlordene to result in a mixture, the ratio of the components thereof may vary under varying process conditions such as light, temperature, pressure and time. However, ordinary variations of the present process do not materially affect the product thereof.

The chlorination of chlordene to produce chlordane as herein contemplated is accomplished by using sulfuryl chloride as a chlorinating agent in the presence of a metallic halide catalyst of a Friedel-Crafts type such as aluminum chloride, stannic chloride, ferric chloride, arsenic trichloride, and antimony pentachloride or mixtures thereof.

A stoichiometric quantity of sulfuryl chloride, or an excess thereof is preferred; thus, since one mole of sulfuryl chloride will react with a mole of chlordene to form one mole of chlordane, less than one mole of sulfuryl chloride per mole of chlordene may be used but this will merely result in leaving some of the original chlordene unreacted. This is not preferred, however, not only from a standpoint of economics, but also because the excess crystalline chlordene in the product is not as easily removed therefrom by crystallization as are the other impurities therein contained. An excess of sulfuryl chloride may be used as hereinbefore mentioned.

The chlorination reaction proceeds readily at ordinary temperatures such as between about normal room temperature and about 120° C. The use of higher temperatures is naturally limited only by the decomposition temperature of the reactants or catalyst employed. Thus, any temperature at which the components of the reaction mixture, before and after reaction, are stable is satisfactory. The use of lower reaction temperatures is not objectionable and is only limited by such temperatures as will unduly diminish the rate of reaction.

A solvent for the reactants which is inert to the action of sulfuryl chloride may be employed. An ideal solvent is merely excess sulfuryl chloride which excess can be recovered when the reaction is completed. Other solvents exemplifying those that can be used are sym-tetrachloroethane, chloroform, carbon tetrachloride or any other solvent inert to the action of the reactants under the conditions employed.

The reactants, catalyst, and solvent, if any be used other than excess sulfuryl chloride, can be intermixed in any order or fashion. A preferred method which may be used comprises gradually adding sulfuryl chloride containing the catalyst to the chlordene either in the presence or absence of other solvent. Gas evolution occurs after some of the sulfuryl chloride containing the metal halide catalyst has been added, and hence it is desirable to add these components slowly.

Another method comprises gradually adding chlordene either in the presence or absence of solvent to sulfuryl chloride containing the hereinbefore mentioned catalyst with or without additional solvent.

The reaction period is not excessive, and a reaction time of only less than about one hour at the reflux temperature of sulfuryl chloride is generally sufficient. The time is not critical, however, and an excessive reaction period is not deleterious. If additional solvent is used, thereby decreasing the concentration of the reactants, reaction periods longer than about one hour may be desirable.

When reaction is completed, excess solvent can be removed by distillation which may be accomplished in vacuo if desired. The residue, containing the desired product, can be dissolved in a hydrocarbon solvent such as pentane, hexane, ligroin, petroleum ether or the like, washed with caustic and water, and directly crystallized to result in relatively pure crystalline chlordane.

The following examples, utilizing aluminum chloride as the metal halide catalyst of a Friedel-Crafts type are for the purpose of illustrating the present invention, without, however, restricting it thereto; it being understood that ferric chloride, stannic chloride, arsenic trichloride and phosphorous pentachloride may be substituted for the aluminum chloride of said examples with substantially equivalent results.

*Example 1*

To a solution of 33.9 grams of chlordene (0.1 mole) in 25 ml. of sulfuryl chloride (0.3 mole)

were added slowly 1.7 grams (0.027 mole) aluminum chloride. After the addition of the latter was complete, the mixture was refluxed (60–70° C.) for one hour and then taken up in pentane. The pentane solution was shaken carefully with water and then small portions of 5% aqueous sodium hydroxide until the aqueous phase was alkaline. Finally, the pentane layer was washed with water until the washings were neutral, and dried with sodium sulfate. Evaporation of the solvent resulted in a residue which was purified by recrystallization from methanol. The substantially pure material melted at 101–104° C., and was identified as the dichloride of chlordene having the structure:

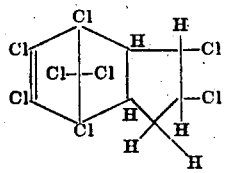

and the following analysis:

Calculated for $C_{10}H_6Cl_8$: C, 29.30; H, 1.46; Cl, 69.30
Found for product:    C, 29.24; H, 1.49; Cl, 69.38

Example 2

To a solution of 100 grams of chlordene in 75 ml. of sulfuryl chloride at 50° C. was added a solution of 1.0 gram of aluminum chloride in 5 ml. of sulfuryl chloride. The aluminum chloride solution was added slowly (ca. 1 drop/min.) until vigorous gas evolution commenced (after ca. 1 ml. thereof had been added), whereupon addition was discontinued until such gas evolution ceased. The remaining catalyst solution was thereafter added at a more rapid rate. After refluxing one hour following the addition of aluminum chloride, the excess solvent was stripped from the reaction mixture under diminished pressure, and the residue was dissolved in pentane and washed with dilute sodium hydroxide and water as described in Example 1. After purification by recrystallization, a yield of substantially pure chlordane as described in Example 1 in the amount of about 70% of the theoretical amount based on the quantity of chlordene utilized was obtained.

It is evident from the foregoing description that the present chlorination method is specific and directionalized, allowing for the recovery of pure chlordane in a manner not heretofore possible. Thus, the product after only ordinary purification by means of recrystallization or the like consists substantially of a single component having the empirical formula $C_{10}H_6Cl_8$ and the structural formula:

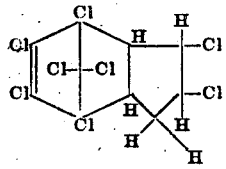

commonly termed chlordane.

Not only does the chlorination method of the present invention produce rapidly and efficiently a product containing a preponderance of only a single component which is easily isolable, but the process is further characterized by the fact that apparently only a single sterioisomer of that compound is produced, of the several sterioisomers of chlordane which are possible and which do occur in the preparation of chlordane from chlordene by chlorination with chlorine. These isomers, although similar generally, differ somewhat as to melting point and other physical properties. The isomer presently produced melts at about 101–104° C.

The toxicity toward insects of the pure chlordane thus produced is approximately equal to the toxicity of technical chlordane prepared by chlorinating chlordene with chlorine to introduce therein an average of two chlorine atoms per molecule. The present product has certain advantages over technical chlordane thus produced in that technical chlordane is a mixture whereas the present product is not, as previously discussed. The present process is also advantageous over the process for producing technical chlordane in that it is comparatively rapid, directionalized, and produces a product easily purified and crystallized.

While the process herein described operates satisfactorily by using a metallic halide catalyst of the class previously enumerated, a catalyst accelerator or activator may be used in catalytic quantity in conjunction with said metallic halide catalysts to result in a more rapid and vigorous process, and in somewhat greater yields of the desired chlordane melting at about 101–104° C. This catalyst accelerator which enhances the catalytic activity of the metal halide catalyst is sulfur monochloride. The sulfur monochloride may be mixed with the metallic halide catalyst and this mixture used in place of the metal halide of Examples 1 or 2, or the sulfur monochloride may be introduced into the reaction mixture in any other way. Thus, and for example, it can be introduced into the chlordene prior to treatment thereof with a sulfuryl chloride-metallic halide mixture, or the sulfur monochloride may be introduced into the sulfuryl chloride-metallic halide mixture and introduced therewith into the reaction mixture; or the sulfur monochloride may be introduced as a separate component approximately simultaneously with the other components. The beneficial effect of the use of sulfur monochloride is obtained as long as sulfur monochloride in catalytic amounts is present in the reaction regardless of its method of introduction.

The following examples are illustrative of the use of sulfur monochloride as a catalyst activator with ferric chloride and antimony pentachloride. These examples are not intended to restrict the mode of addition of the sulfur monochloride, nor do they imply that it is useful only with ferric chloride or antimony pentachloride.

Example 3

To a solution of 1 gram ferric chloride and 1 gram sulfur monochloride in 37 ml. of sulfuryl chloride was slowly added a solution of 20 grams chlordene in 20 ml. sulfuryl chloride. The time of addition was about four minutes. The reaction was fairly vigorous during addition as evidenced by gas evolution. After refluxing for less than about one hour, a substantial yield of chlordane having a melting point of 101–104° C. was isolated from the reaction mixture as hereinbefore described in Example 1.

Example 4

To a solution of 1 gram antimony pentachloride 1 gram sulfur monochloride in 37 ml. of sulfuryl chloride was slowly added a solution of 20 grams chlordene in 20 ml. sulfuryl chloride. The time of addition was about four minutes. The reaction was fairly vigorous during addition as evidenced by gas evolution. After refluxing for less than about one hour, a substantial yield of chlordane having a melting point of 101–104° C. was isolated from the reaction mixture as described in Example 1.

I claim as my invention:

1. A process for preparing 1,2,4,5,6,7,8,8-octachloro - 3a,4,7,7a - tetrahydro - 4,7 - methanoindane which comprises reacting 4,7-methano-3a,4,7,7a - tetrahydro - 4,5,6,7,8,8 - hexachloroindene with sulfuryl chloride in the presence of a Friedel-Crafts type catalyst selected from the group aluminum chloride, stannic chloride, ferric chloride, arsenic trichloride, antimony pentachloride and mixtures thereof at a temperature below the decomposition temperature of the reaction mixture components.

2. A process according to claim 1 wherein the Friedel-Crafts type catalyst is aluminum chloride.

3. A process according to claim 1 wherein the Friedel-Crafts type catalyst is added to a mixture of said 4,7 - methano - 3a,4,7,7a - tetrahydro - 4,5,6,7,8,8-hexachloroindene and sulfuryl chloride.

4. A process for preparing a material having the structural formula:

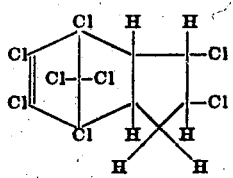

and of 101–104° C. melting point, which comprises reacting 4,7 - methano - 3a,4,7,7a - tetrahydro - 4,5,6,7,8,8-hexachloroindene with sulfuryl chloride in the presence of a Friedel-Crafts type catalyst selected from the group aluminum chloride, stannic chloride, ferric chloride, arsenic trichloride, antimony pentachloride and mixtures thereof, in a solvent relatively inert to the action of sulfuryl chloride, and at a temperature below the decomposition temperature of the reaction mixture components, stripping volatile solvent therefrom, and recovering said material of 101–104° C. melting point from the residue by recrystallization from a solvent.

5. A process according to claim 4 wherein sulfur monochloride is present in the reaction mixture.

6. A process for preparing 1,2,4,5,6,7,8,8-octachloro - 3a,4,7,7a - tetrahydro - 4,7 - methanoindane of 101–104° C. melting point which comprises mixing 4,7-methano-3a,4,7,7a-tetrahydro-4,5,6,7,8,8-hexachloroindene with a stoichiometric excess of sulfuryl chloride, and gradually adding to said mixture aluminum chloride dissolved in sulfuryl chloride at a temperature below the decomposition temperature of the reaction mixture components, stripping excess sulfuryl chloride therefrom, and recovering said indane as the reaction product of the process from the residue by recrystallization.

7. A process according to claim 6 wherein sulfur monochloride is an additional catalyst component.

8. A process for preparing 1,2,4,5,6,7,8,8-octachloro - 3a,4,7,7a - tetrahydro - 4,7 - methanoindane which comprises reacting 4,7-methano-3a,4,7,7a - tetrahydro - 4,5,6,7,8,8 - hexachloroindene with sulfuryl chloride in the presence of sulfur monochloride and a Friedel-Crafts type catalyst selected from the group of aluminum chloride, stannic chloride, ferric chloride, arsenic trichloride, antimony pentachloride and mixtures thereof at a temperature below the decomposition temperature of the reaction mixture components.

9. A process according to claim 8 wherein the Friedel-Crafts type catalyst is aluminum chloride.

10. A process according to claim 8 wherein the Friedel-Crafts type catalyst is added to a mixture of said 4,7 - methano - 3a,4,7,7a - tetrahydro - 4,5,6,7,8,8-hexachloroindene, sulfuryl chloride and sulfur monochloride.

MORTON KLEIMAN.

REFERENCES CITED

The following references are of record in the file of this patent:

FOREIGN PATENTS

| Number | Country | Date |
|--------|---------|------|
| 618,432 | Great Britain | Feb. 22, 1949 |

OTHER REFERENCES

Kharasch et al.: "Jour. Am. Chem. Soc.," vol. 61, pp. 2142–2149.

Thomas: "Anhydrous Aluminum Chloride in Organic Chemistry," Reinhold Co. publishers, 1941, pp. 613, 614, 673 and 674.